Feb. 7, 1950 R. S. BUCK 2,496,774
THERMOELECTRIC GAS PROBE
Filed Dec. 18, 1946
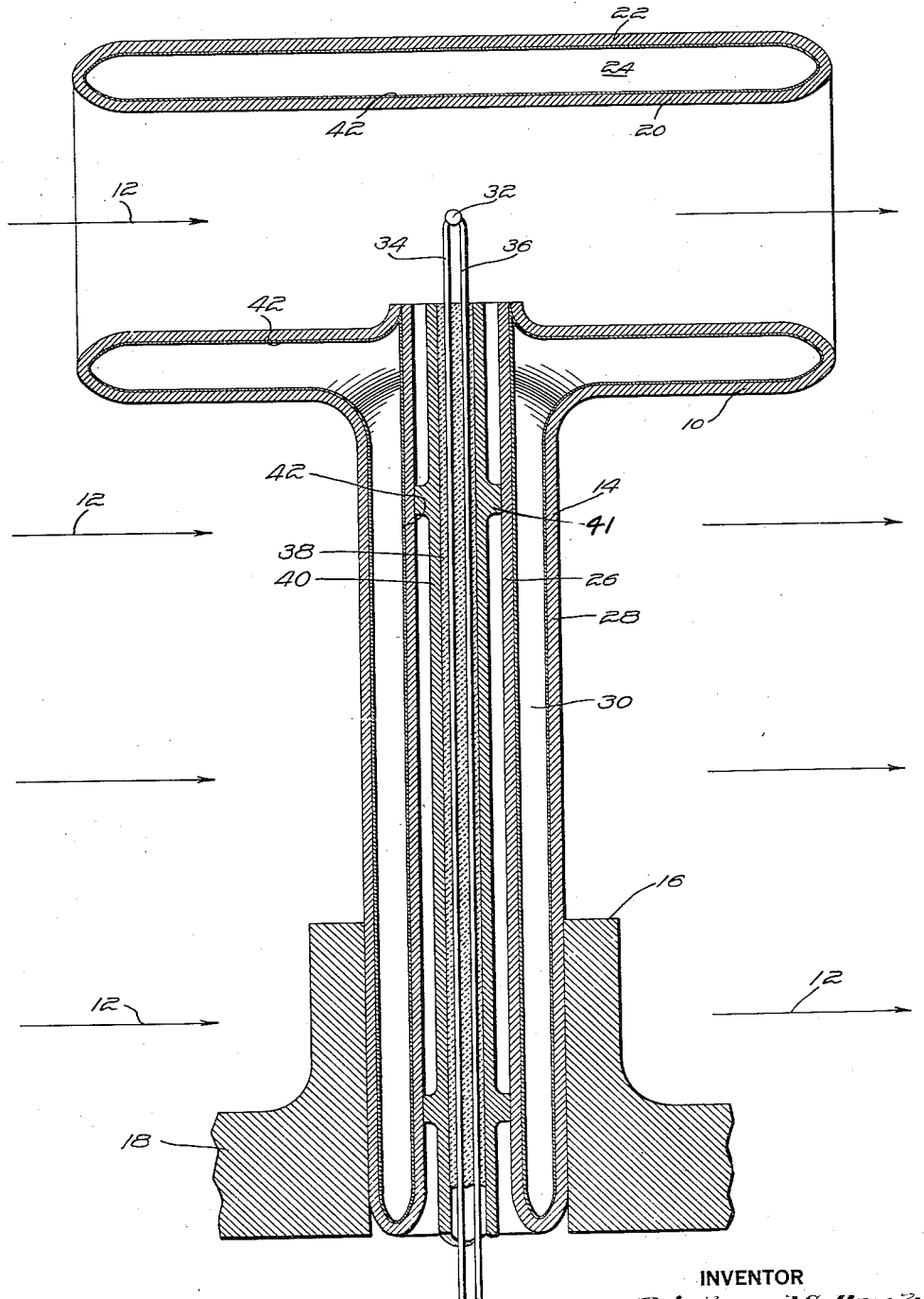
INVENTOR
Richard S. Buck
BY Charles A. Warren
ATTORNEY Patented Feb. 7, 1950

2,496,774

UNITED STATES PATENT OFFICE 2,496,774

THERMOELECTRIC GAS PROBE

Richard S. Buck, Glastonbury, Conn., assignor to United Aircraft Corporation, East Hartford, Conn., a corporation of Delaware Application December 18, 1946, Serial No. 717,047

5 Claims. (Cl. 136—4)

The present invention relates to a gas probe particularly adapted for use in measuring the temperatures of hot gas streams.

One of the problems in measuring temperatures of hot gas is the loss of heat from the thermocouple by radiation to the walls of the duct in which the hot gas stream is flowing. A cylindrical shield has been used within which the thermocouple element is located with the shield approximating the temperature of the gas and thereby reducing the amount of heat radiated by the thermocouple. The shield, however, in turn radiates heat to the walls of the duct and also loses heat by conduction along the supporting structure. A feature of this invention is a shield by which to minimize the rate of heat transfer to the duct walls both from the shield and from the thermocouple.

Another feature is an arrangement of the supporting structure for the thermocouple and shield by which to reduce further the loss of heat from the shield and from the thermocouple. A feature of the invention is a probe which may be extremely small in size.

Other objects and advantages will be apparent from the specification and claims, and from the accompanying drawing which illustrates an embodiment of the invention.

The single figure is a sectional view through the probe.

The probe consists of a substantially cylindrical shield 10 positioned with its longitudinal axis substantially parallel to the gas stream represented by the arrows 12. The shield 10 is carried by a stem 14 which may be releasably or permanently fastened in a support 16, the latter in many cases forming an integral part of the wall 18 of the duct in which the gas is flowing.

The shield 10, which may be made, for example, from a stainless steel or from one of the nonferrous, high temperature alloys, is made up of concentric inner and outer walls 20 and 22 spaced from each other to define a space 24 which may be evacuated, the ends of the walls 20 and 22 being connected together at opposite ends to form the gas tight space 24. Similarly the stem 14, which may be the same type of material as the shield 10, consists of spaced inner and outer walls 26 and 28 forming a space 30 which may be evacuated and which intersects with the space 24. As shown the walls of the shield 10 and the walls of the stem 14 may all be integral, with a sealed connection where the inner wall 26 intersects the wall 20 of the shield 10.

The thermocouple element or junction 32 is located within the shield 10 and the connecting wires 34 and 36 of dissimilar materials which support the thermocouple element may be located in a ceramic tube 38 positioned within a metallic supporting tube 40 within the stem 14. As shown, the tube 40 may have projections 41 to hold it in spaced relation to the inner wall 26 of the stem in such a way that the tube 40 with the thermocouple wires and element may be removed for replacement.

As shown, the probe is supported by engagement between the outer wall 28 of the stem and the supporting element 16 so that the only heat conduction from the shield 10 and the probe is along the outer wall 28 to the supporting structure 16. By evacuating the spaces 24 and 30 the heat transfer rate by conduction or connection between the inner and outer walls 20 and 22 of the shield or 26 and 28 of the stem is materially reduced, thereby maintaining the wall 20 of the shield at a temperature very close to the temperature of the gas passing through it. For reducing the heat transfer further, the outer surface of the inner wall 20 and the inner surface of the outer wall 22 may be covered with a material of low emissivity 42 which, by reason of the absence of oxygen in the space 24, retains its low emissivity without oxidizing at the temperatures under which the probe is used. The space 24 may be filled with an inert gas if it is found that the vacuum therein causes the probe to collapse at high temperatures. The inert gas will prevent oxidation of the coating of low emissivity.

With this arrangement not only does the gas probe have a double walled shield but the only way by which heat can travel by conduction from the inner shield is through the connection at the ends of the walls of the shield. Since the rate of conduction is materially reduced and since the rate of radiation is reduced by the surfaces of low emissivity, which may be provided, for example, by indium plating the wall surfaces, as shown at 42, the temperature indicated by the thermocouple element will be very close to the actual temperature of the gas stream.

Although the probe has been described as useful for measuring high temperatures, it is also usable where the gas temperature is lower than the temperature of the duct walls as in refrigerated gas. In this case the shield prevents the thermocouple junction from receiving heat from the walls of the duct.

It is to be understood that the invention is not limited to the specific embodiment herein illustrated and described, but may be used in other ways without departure from its spirit as defined by the following claims.

I claim:

1. A gas probe including a stem, thermocouple wires supported in said stem and secured together at their inner ends to form a junction, a metallic shield on the inner end of the stem with the thermocouple junction located substantially centrally with the shield, said shield being open at both ends and having its axis at a substantial angle to the stem, said shield having spaced walls connected together at opposite ends to form a sealed chamber surrounding the thermocouple junction, the adjacent surfaces of said walls having a coating of a material of low emissivity for reducing heat radiation.

2. A gas probe including a stem, thermocouple wires supported in said stem and secured together at their inner ends to form a junction, a shield on the inner end of the stem with the thermocouple junction located substantially centrally with the shield, said shield being open at both ends and having its axis at a substantial angle to the stem, said shield having spaced walls connected together at opposite ends to form a sealed chamber surrounding the thermocouple junction, the adjacent surfaces of said walls having a coating of a material of low emissivity for reducing heat radiation, said chamber having the oxygen removed therefrom to prevent oxidation of the coating.

3. A gas probe including a stem, thermocouple wires supported in said stem and secured together at their inner ends to form a junction, a metallic shield on the inner end of the stem with the thermocouple junction located substantially centrally with the shield, said shield being open at both ends and having its axis at a substantial angle to the stem, said shield having spaced walls connected together at opposite ends to form a sealed chamber surrounding the thermocouple junction, the adjacent surfaces of said walls having a coating of a material of low emissivity for reducing heat radiation, said chamber being filled with an inert gas to prevent oxidation of the coating.

4. A gas probe for a thermocouple element including a pair of wires of dissimilar materials located in a tube and being connected together at one end of the tube to form a thermocouple junction, said probe including a hollow stem in which the thermocouple element is positioned with the junction projecting from one end of the stem, a double-walled substantially cylindrical metallic shield mounted on the end of the stem to surround the junction, said double-walled shield having its inner and outer walls connected together adjacent opposite ends to form a chamber extending around the thermocouple junction, the inside wall surfaces of the said chamber being coated with a material of low emissivity.

5. A gas probe for a thermocouple element including a pair of wires of dissimilar materials located in a tube and being connected together at one end of the tube to form a thermocouple junction, said probe including a hollow stem in which the thermocouple element is positioned with the junction projecting from one end of the stem, a double-walled substantially cylindrical metallic shield mounted on the end of the stem to surround the junction, said double-walled shield having its inner and outer walls connected together adjacent opposite ends to form an annular chamber extending around the thermocouple junction, the inside wall surfaces of the said chamber being coated with a material of low emissivity, said chamber having the oxygen removed to prevent oxidation of the coating.

RICHARD S. BUCK.

REFERENCES CITED

The following references are of record in the file of this patent:

UNITED STATES PATENTS

| Number | Name | Date |
| --- | --- | --- |
| 1,451,283 | Weatherwax | Apr. 10, 1923 |
| 1,615,983 | Jones | Feb. 1, 1927 |
| 1,791,020 | Wilson | Feb. 3, 1931 |
| 1,818,221 | Huber | Aug. 11, 1931 |
| 1,993,063 | Klopsteg | Mar. 5, 1935 |
| 2,095,783 | Wilson | Oct. 12, 1937 |

FOREIGN PATENTS

| Number | Country | Date |
| --- | --- | --- |
| 320,194 | Great Britain | Oct. 10, 1929 |

OTHER REFERENCES

Franz, A., National Advisory Committee on Aeronautics Technical Memorandum No. 953, September 1940, page 5, 6 and 8.

King, W. J., Trans A. S. M. E. vol. 65 (1943), page 426–7.

Revere, "Instruments" vol. 17 (1944), page 378.